United States Patent

[11] 3,628,091

| [72] | Inventor | Herman B. Wolf<br>Charlotte, N.C. |
|---|---|---|
| [21] | Appl. No. | 36,893 |
| [22] | Filed | May 13, 1970 |
| [45] | Patented | Dec. 14, 1971 |
| [73] | Assignee | R. H. Bouligny, Inc.<br>Charlotte, N.C. |

[54] RESONANCE SUPPRESSOR FOR ELECTRICAL SYSTEM INCLUDING CAPACITORS
5 Claims, 1 Drawing Fig.

[52] U.S. Cl. .................................................. 317/12 A, 307/99
[51] Int. Cl. ................................................... H02h 7/16
[50] Field of Search ........................................ 307/93, 98, 99; 317/12 A, 12 R, 36 TD, 53; 323/74, 93

[56] References Cited
UNITED STATES PATENTS

| 2,579,303 | 12/1951 | Crary | 317/12 A |
| 3,457,459 | 7/1969 | Wolf | 317/12 A |
| 2,072,717 | 3/1937 | Marbury | 317/12 B |
| 2,120,855 | 6/1938 | Buell | 307/98 X |
| 2,323,702 | 7/1943 | Berkey | 317/12 A |

OTHER REFERENCES

H. B. Wolf, " Regulation and Protection of Electric Circuits Through Application of Series Capacitors and in Coordination with Shunt Capacitors," Paper Presented at Southeastern Electric Exchange Meeting, Miami Beach, Fla., Oct. 1965, pages 1, 11, 12.

*Primary Examiner*—A. D. Pellinen
*Attorney*—Parrott, Bell, Seltzer, Park & Gibson ABSTRACT: Resonance effects otherwise possibly occurring in a main alternating current electrical circuit having a bank of capacitors connected therein are suppressed by a circuit arrangement which inserts a resonance suppressing resistance into parallel, shunting conductive relation with the bank of capacitors in response to sensing of the presence of a predetermined voltage across the bank of capacitors.

Patented Dec. 14, 1971
3,628,091
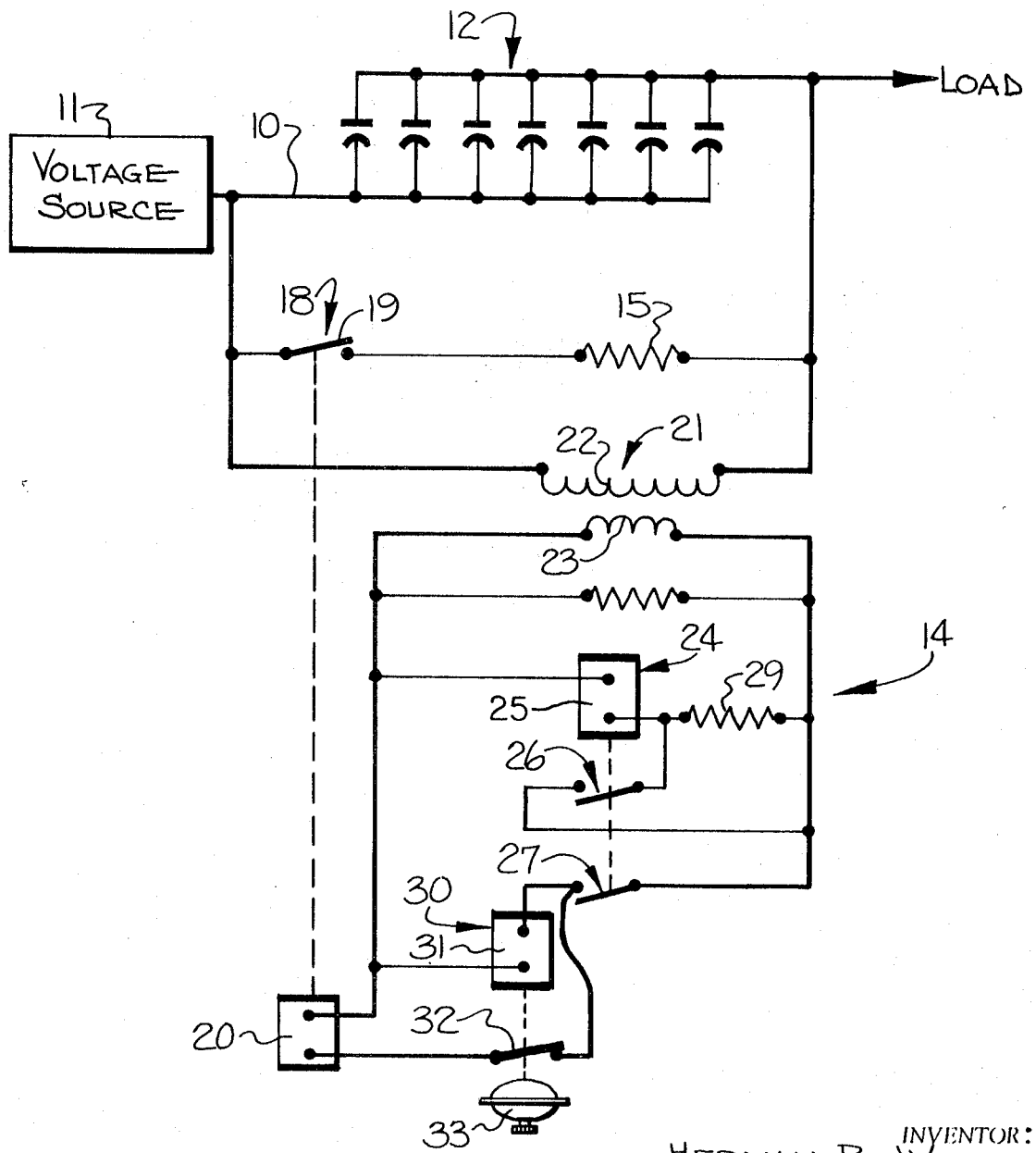
INVENTOR:
HERMAN B. WOLF
BY Parrott, Bell, Seltzer, Park & Gibson
ATTORNEYS

RESONANCE SUPPRESSOR FOR ELECTRICAL SYSTEM INCLUDING CAPACITORS

This invention relates to an alternating current electrical system or circuit and more particularly to such an electrical system or circuit which includes a bank of capacitors.

It is known that a bank of capacitors, within which the capacitors are connected in parallel to each other, may be connected in series with a load in an alternating current electrical circuit in order to provide a voltage boost to the circuit and to contribute to a reactive component of power in the circuit. Such capacitors are commonly referred to as "series capacitors".

Circuits containing a series capacitance are subject to resonance effects which may occur under certain circumstances. While the circumstances giving rise to resonance may vary, the occurrence of this phenomenon is indicated by sharp voltage variations in the circuit and oscillations which may cause considerable noise in transformers included in the circuit.

In particular, resonance may occur as a result of the presence in the circuit of both a series capacitance and an inductance consisting of one or more iron core reactors, such as unloaded or lightly loaded transformers, in which instance the resonance effect is referred to as "ferroresonance". Resonance may also occur where the circuit load includes a large motor which may be started while the circuit is otherwise lightly loaded. After the motor is connected to the circuit and begins to turn, resonance effects referred to as "subsynchronous resonance" may occur and the motor may stop its acceleration at a subsynchronous speed.

In view of the above, it is an object of the present invention to suppress resonance effects otherwise possibly occurring in a main alternating current electrical circuit, so as to avoid the voltage and current fluctuations occurring during resonance. In accomplishing this object of the present invention, means are provided in combination with the main alternating current electrical circuit for sensing the presence of a predetermined voltage across a bank of capacitors and, upon appearance of a predetermined voltage, inserting a resonance-suppressing means into parallel, shunting conductive relation with the bank of capacitors. Preferably, the resonance-suppressing means is a resistance selected to have a value significantly changing the resonant frequency of the main electrical circuit, and connectable through the contact set of a relay for suppressing resonance phenomenon of either the subsynchronous or ferroresonance types.

Some of the objects of the invention having been stated, other objects will appear as the description proceeds, when taken in connection with the accompanying drawings, in which —

The drawing comprises a schematic view of an electrical circuit incorporating the features of the present invention.

Referring now more particularly to the drawing, a main alternating current electrical circuit is there shown having a bank of capacitors connected therein and incorporating means for suppressing resonance in accordance with the present invention. Such a main alternating current electrical circuit may be a distribution circuit, a transmission circuit or any other desired circuit but in all instances includes a bus line 10 or the like connected to an alternating current voltage source 11 which normally supplies a predetermined applied voltage thereto and may be a station bus, transmission line or a portion of a system or network. The bus line 10 may be single phase, two phase or three phase as required, with a single phase having been shown and with it being understood that if a multiphase circuit is used, the bus line 10 represents one phase thereof and the other phases will be substantially as shown. Electrical current flowing in the bus line 10 is delivered to a load connected therethrough, as indicated in the drawing.

Connected in the circuit is a bank 12 of capacitors. As indicated, the bank 12 of capacitors desirably comprises a plurality of individual capacitors, electrically connected in parallel one to another. However, the bank 12 of capacitors is connected in series with the bus line 10, between the voltage source 11 and the load to which current is supplied. As discussed hereinabove, such a main alternating current electrical circuit is subject to the occurrence therein of resonance phenomenon, such as ferroresonance and subsynchronous resonance, should certain circumstances arise.

In order to suppress resonance otherwise possibly occurring in the circuit, the present invention includes voltage-responsive means generally indicated at 14 connected in parallel with the bank 12 of capacitors for sensing the presence of a predetermined voltage thereacross and resonance-suppressing means generally indicated at 15 operatively connected to the voltage-responsive means 14 and to the bank 12 of capacitors for insertion into parallel, shunting conductive relation with the bank of capacitors in response to the sensing of the predetermined voltage thereacross and for suppressing resonance in the circuit. As will be disclosed more fully hereinafter, the voltage-responsive means is responsive to a level of voltage across the bank 12 of capacitors indicative of the occurrence of a resonance phenomenon. Such a voltage rise across the bank of capacitors is one of the results flowing from the occurrence of resonance phenomena.

In accordance with the present invention, the voltage responsive-means 14 comprises a suppressor-inserting contact set 18 and contact-actuating means operatively connected with the contact set 18 for changing the conductive state thereof upon the predetermined voltage appearing across the bank of capacitors. Preferably, and as illustrated, the suppressor-inserting contact set 18 comprises a movable armature 19 magnetically coupled to a magnetic field generating winding 20, so that the winding 20 and contact set 18 together comprise a relay. As voltage is applied to the relay winding 20, the movable armature 19 is moved between open contact and closed contact positions, changing the conductive state of the contact set 18 and inserting or removing the resonance-suppressing means 15 from parallel conductive relation with the bank 12 of capacitors.

Voltage is applied to the relay winding 20 from a potential transformer 21 and through additional circuit elements of the voltage-responsive means 14. The potential transformer 21 has a primary winding 22 connected in parallel with the bank 12 of capacitors and a secondary winding 23 connectable to the relay winding 20 as disclosed more fully hereinafter. By means of the potential transformer 21, a voltage is induced in the secondary winding 23 which is correlated to the voltage appearing across the bank 12 of capacitors and in the primary winding 22. While voltage is present in the secondary winding 23 at any time that voltage is applied to the primary winding 22, such voltage does not necessarily always energize the relay winding 20 of the contact actuating means, as will now be disclosed.

The voltage-responsive means 14 additionally incorporates an instantaneous voltage relay 24, having a winding 25 and first and second contact sets 26 and 27. The winding 25 of the instantaneous voltage relay 24 is normally electrically connected to the secondary winding 23 of the transformer 21 by means of a seal-in resistor 29. Upon the appearance across the secondary winding 23 of a predetermined voltage, indicative of resonance occurring in the main electrical circuit, energization of the winding 25 of the instantaneous voltage relay is such as to close the associated contact sets 26 and 27. Closure of the first contact set 26 of the instantaneous voltage relay bypasses the seal-in resistor 29, maintaining energization of the winding 25 of the instantaneous voltage relay and maintaining the first and second contact sets 26, 27 thereof closed. Closure of the second contact set 27 applies the voltage appearing across the secondary winding 23 to a definite time relay 30 having a winding 31, a normally closed contact set 32 and a delay means 33. Additionally, the voltage appearing across the secondary winding 23 is applied through the contact set 32 of the definite time relay 30 to the relay winding 20 of the contact-actuating means.

In operation, the first and second contact sets 26, 27 of the instantaneous voltage relay normally remain open, even though relatively low levels of voltage may appear in the secondary winding 23. Upon the occurrence of resonance in the main electrical circuit including the bank 12 of capacitors, the voltage appearing across the capacitors rises sufficiently that the voltage thusly induced in the secondary winding 23 and flowing through the winding 25 of the instantaneous voltage relay results in closure of the first and second contact set 26, 27 of the instantaneous voltage relay. Such closure applies voltage to the relay winding 20 which actuates the suppressor-inserting contact set 18, thereby placing the resonance-suppressing means 15 in parallel, shunting conductive relation with the bank 12 of capacitors. Resonance occurring in the main electrical circuit is then suppressed and, with the disappearance of the predetermined voltage across the bank 12 of capacitors, the contact sets of the voltage-responsive means 14 are opened. It may be anticipated that suppression of resonance will occur relatively quickly, as within three to five cycles of the alternating current flowing in the circuit.

In the event that a fault in the main electrical circuit or other effect gives rise to a voltage across the bank 12 of capacitors sufficiently high to operate the voltage-responsive means 14, but continuing beyond a duration typical of the occurrence of resonance in the circuit, energization of the definite time relay 30 continues for an interval of time sufficient to overcome the resistance to opening the contact set 32 presented by the delay means 33. With such continuance of voltage, the normally closed contact set 32 of the definite time relay 30 opens, removing energization from the relay winding 20 of the contact-actuating means, and opening the suppressor-inserting contact set 18. Such operation avoids the possibilities of damage to the resonance-suppressing means 15 otherwise possibly occurring due to imposition of excessive voltage and current.

As will be noted from the drawing, it is appropriate that the resonance-suppressing means 15 be a resistance, selected to vary the resonance frequency of the main electrical circuit upon insertion into shunting conductive relation with the bank 12 of capacitors. While the use of a resistance is a particularly practicable and preferred manner of providing a resonance-suppressing means, other means of altering the resonant frequency of the circuit may be employed if so desired.

In the drawing and specification there has been set forth a preferred embodiment of the invention, and although specific terms are employed, they are used in a generic and descriptive sense only and not for purposes of limitation.

I claim:

1. In a main alternating current electrical circuit having a bank of capacitors connected therein, the combination of means for suppressing resonance otherwise possibly occurring in said circuit and comprising:
   resonance-suppressing means operatively connected with said bank of capacitors for insertion into parallel, shunting conductive relation therewith and thereby for suppressing resonance in said circuit,
   voltage-responsive means connected in parallel with said bank of capacitors for sensing the presence of a predetermined voltage thereacross indicative of a ferro or subsynchronous resonance condition existing in said circuit and operatively connected to said resonance-suppressing means for inserting the same into parallel conductive relation with said bank of capacitors in response to sensing of said predetermined voltage thereacross, and
   timing means operatively connected to said resonance-suppressing means for removing said resonance-suppressing means from parallel conductive relation with said bank of capacitors upon continuance of said predetermined voltage thereacross for a predetermined time period.

2. An electrical circuit according to claim 1 wherein said voltage-responsive means includes a suppressor-inserting switch and switch-actuating means.

3. An electrical circuit according to claim 2 wherein said suppressor-inserting switch comprises a movable armature and said switch-actuating means comprises a magnetic field generating winding coupled to said armature for moving said armature in response to voltage applied to said winding.

4. An electrical circuit according to claim 2 wherein said voltage-responsive means further comprises a potential transformer having a primary winding connected in parallel with said bank of capacitors and a secondary winding connected to said contact-actuating means, said potential transformer applying to said contact-actuating means a voltage correlated to the voltage appearing across said bank of capacitors.

5. An electrical circuit according to claim 1 wherein said resonance-suppressing means comprises a resistor normally maintained out of current-conducting relation with said main circuit and operative upon insertion thereinto for modifying the resonant frequency of said main circuit.

* * * * *